United States Patent
Li et al.

(10) Patent No.: US 12,187,538 B2
(45) Date of Patent: Jan. 7, 2025

(54) METHOD FOR CALCULATING OBJECT PICK-AND-PLACE SEQUENCE AND ELECTRONIC APPARATUS FOR AUTOMATIC STORAGE PICK-AND-PLACE

(71) Applicant: GlobalWafers Co., Ltd., Hsinchu (TW)

(72) Inventors: Chia-Lin Li, Hsinchu (TW); Shang-Chi Wang, Hsinchu (TW); Chi Yuan Hsu, Hsinchu (TW); Han-Zong Wu, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 350 days.

(21) Appl. No.: 17/863,416

(22) Filed: Jul. 13, 2022

(65) Prior Publication Data

US 2023/0126461 A1   Apr. 27, 2023

(30) Foreign Application Priority Data

Oct. 27, 2021 (TW) .................................. 110139930

(51) Int. Cl.
*B65G 1/137* (2006.01)
*G01G 19/52* (2006.01)
*G06Q 10/04* (2023.01)
*G06Q 10/087* (2023.01)

(52) U.S. Cl.
CPC ........... *B65G 1/1373* (2013.01); *G01G 19/52* (2013.01); *G06Q 10/04* (2013.01); *G06Q 10/087* (2013.01)

(58) Field of Classification Search
CPC ....................................................... G01G 19/52
See application file for complete search history.

(56) References Cited

U.S. PATENT DOCUMENTS

| | | | |
|---|---|---|---|
| 2020/0283279 A1* | 9/2020 | Chow | ........................ B66F 9/22 |
| 2022/0402709 A1* | 12/2022 | Pidaparthi | .............. B65G 61/00 |

FOREIGN PATENT DOCUMENTS

| | | |
|---|---|---|
| CN | 108346021 | 7/2018 |
| CN | 112330237 | 2/2021 |
| CN | 112700194 | 4/2021 |
| TW | M575565 | 3/2019 |

* cited by examiner

*Primary Examiner* — Nathan L Laughlin
(74) *Attorney, Agent, or Firm* — JCIPRNET (57) ABSTRACT

A method for calculating an object pick-and-place sequence and an electronic apparatus for automatic storage pick-and-place are provided. When a warehousing operation is to be performed, the following steps are performed. A weight of an object to be stocked that is to be put on a shelf is obtained. The weight is substituted into a plurality of coordinate positions corresponding to a plurality of unused grid positions respectively, so as to calculate a plurality of estimated center of gravity positions. Whether the estimated center of gravity positions are located within a balance standard area is determined so as to sieve out a plurality of candidate grid positions from these unused grid positions. One of the candidate grid positions is selected as a recommended position of the object to be stocked.

15 Claims, 5 Drawing Sheets

METHOD FOR CALCULATING OBJECT PICK-AND-PLACE SEQUENCE AND ELECTRONIC APPARATUS FOR AUTOMATIC STORAGE PICK-AND-PLACE

CROSS-REFERENCE TO RELATED APPLICATION

This application claims the priority benefit of Taiwan application serial no. 110139930, filed on Oct. 27, 2021. The entirety of the above-mentioned patent application is hereby incorporated by reference herein and made a part of this specification.

BACKGROUND OF THE INVENTION

Field of the Invention

The invention relates to an automatic control technique, and in particular, to a method for calculating an object pick-and-place sequence and an electronic apparatus for automatic storage pick-and-place.

Description of Related Art

With the advancement of science and technology, the advent of robots has brought new impacts to all walks of life. In logistics and warehousing, robots are used to replace labor, and automatic control is achieved, thereby reducing labor costs. However, traditionally, there is no clear pick-and-place principle for the warehousing and pick-and-place of cargo in the warehouse, and only fixed-point space selection and placement are performed. Therefore, in the absence of a strict placement sequence, the shelves are unbalanced due to the uneven weight distribution of the objects carried thereon. Accordingly, when unbalanced shelves are transported by robots, the shelves may tilt or collapse, resulting in system malfunction and industrial accidents. In addition, the support shafts of the robots also have a shortened lifespan when carrying shelves with unbalanced weight for a prolonged period of time.

SUMMARY OF THE INVENTION

The invention provides a method for calculating an object pick-and-place sequence and an electronic apparatus for automatic storage pick-and-place that may reduce the occurrence of system malfunction or industrial accidents.

A method for calculating an object pick-and-place sequence of the invention includes: coordinating a plurality of grid positions included in a shelf; and performing an optimization calculation when a warehousing operation is to be performed. The optimization calculation includes: obtaining a weight of an object to be stocked that is to be put on the shelf; substituting the weight into a plurality of coordinate positions corresponding to a plurality of unused grid positions in the grid positions, respectively, so as to calculate a plurality of estimated center of gravity positions corresponding to the unused grid positions in which the object to be stocked is respectively placed; determining whether the estimated center of gravity positions are located within a balance standard area so as to sieve out a plurality of candidate grid positions from these unused grid positions; and selecting one of the candidate grid positions as a recommended position of the object to be stocked.

In an embodiment of the invention, the method for calculating the object pick-and-place sequence further includes: obtaining object information of each of a plurality of objects to be processed to obtain the weight of each of the objects to be processed; and regarding the objects to be processed as the object to be stocked one by one, so as to obtain the recommended position corresponding to each of the objects to be processed.

In an embodiment of the invention, the method for calculating the object pick-and-place sequence further includes, after the object information of each of the objects to be processed is obtained: determining an object stocking sequence in which the objects to be processed are placed on the shelf based on the weight of each of the objects to be processed; and regarding the objects to be processed as the object to be stocked one by one based on the object stocking sequence.

In an embodiment of the invention, the optimization calculation further includes: selecting one of the plurality of grid positions as the recommended position of the object to be stocked based on a preset sequence in a case that no object is yet placed on the shelf; and obtaining the weight of the object to be stocked that is to be put on the shelf in a case that there is a stocked object on the shelf, so as to obtain the recommended position based on the weight.

In an embodiment of the invention, the method for calculating the object pick-and-place sequence further includes, after whether the estimated center of gravity positions are located in the balance standard area is determined: adjusting a storage position of at least one stocked object already present on the shelf in a case that none of the estimated center of gravity positions are within the balance standard area.

In an embodiment of the invention, the method for calculating the object pick-and-place sequence further includes: calculating a current center of gravity position of the shelf in a case that there is a stocked object in the shelf, and determining a current balance level of the shelf based on the current center of gravity position; determining an estimated balance level of the shelf in a case that the object to be stocked is placed to each of the candidate grid positions based on the center of gravity positions calculated from respectively placing the object to be stocked to the candidate grid positions; and selecting one of the plurality of candidate grid positions as the recommended position of the object to be stocked by comparing the current balance level with the estimated balance level.

In an embodiment of the invention, the method for calculating the object pick-and-place sequence further includes: dividing the shelf into a plurality of spaces in a vertical direction, and defining a plurality of the balance standard area in the spaces respectively, wherein a vertical extending direction based on a center of gravity when no object is yet placed on the shelf is regarded as a central axis of the balance standard areas, and the balance standard areas are distinguished with a plurality of distances from the central axis in a horizontal plane, and each of the balance standard areas has a corresponding relationship with the estimated balance level corresponding to the shelf.

An electronic apparatus for automatic storage pick-and-place of the invention includes: a storage including a shelf database, wherein the shelf database stores shelf coordinate data and a storage record respectively corresponding to a plurality of shelves; and a processor coupled to the storage. The processor is configured to: coordinate a plurality of grid positions included in each of the shelves to obtain the corresponding shelf coordinate data, and store the shelf coordinate data in the shelf database; and perform an optimization calculation when a warehousing operation is to be performed on one selected shelf among the shelves, wherein the optimization calculation includes: obtaining a weight of an object to be stocked that is to be put on the selected shelf; substituting the weight into a plurality of coordinate positions corresponding to a plurality of unused grid positions in the plurality of grid positions included in the selected shelf, respectively, so as to calculate a plurality of estimated center of gravity positions corresponding to the plurality of unused grid positions in which the object to be stocked is respectively placed; determining whether the estimated center of gravity positions are located in a balance standard area so as to sieve out a plurality of candidate grid positions from these unused grid positions; and selecting one of the candidate grid positions as a recommended position of the object to be stocked.

In an embodiment of the invention, the electronic apparatus further includes a communication circuit coupled to the processor. The processor is configured to: transmit the recommended position to a pick-and-place machine via the communication circuit.

In an embodiment of the invention, the processor is configured to obtain the weight of the object to be stocked that is to be placed on the selected shelf from the scanner via the communication circuit.

Based on the above, in the disclosure, the optimization calculation is performed during the warehousing operation to find the best placement position that does not affect the balance of the shelves, thereby reducing the proportion of industrial accidents when the robot is transporting the shelves.

DESCRIPTION OF THE EMBODIMENTS

Figure 1:
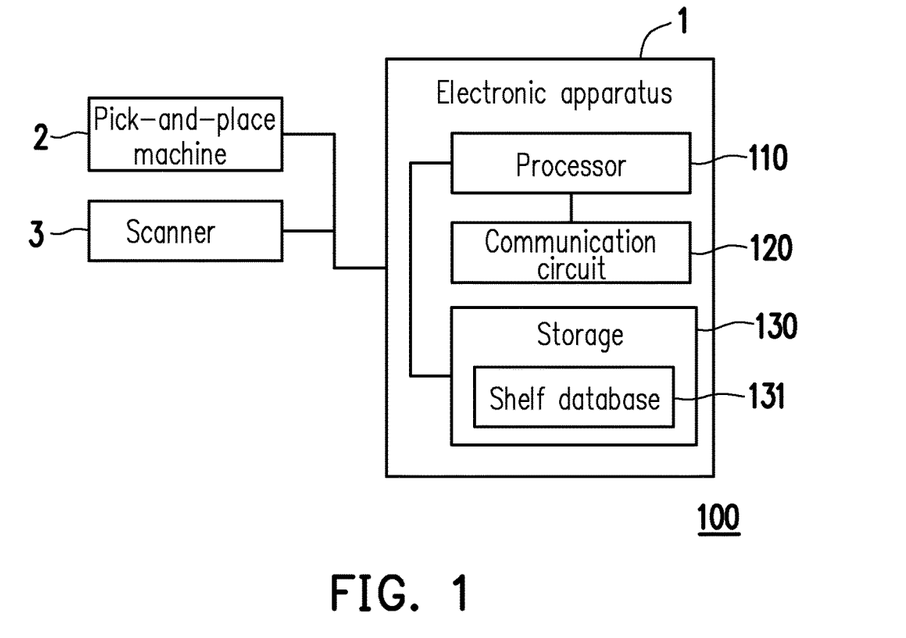
FIG. 1 is a block diagram of an object pick-and-place system according to an embodiment of the invention.

FIG. 1 is a block diagram of an object pick-and-place system according to an embodiment of the invention. An object pick-and-place system 100 includes an electronic apparatus 1, a pick-and-place machine 2, and a scanner 3. The electronic apparatus 1 may communicate with the pick-and-place machine 2 and the scanner 3 in a wired or wireless manner.

The pick-and-place machine 2 is used to retrieve an object (stocked object) from the shelf, or put an object to be processed on the shelf. The scanner 3 is used to scan the object information of the object to be processed. For example, a corresponding identification code is attached to each object to be processed, and the scanner 3 obtains the object information of each object to be processed by scanning the identification code. The object information includes the weight of the object, the object code, etc. The identification code may be a quick response (QR) code or a two-dimensional barcode, etc.

The electronic apparatus 1 may be implemented by a personal computer, a notebook computer, a tablet computer, a smart phone, etc., or any apparatus having computing functions, and the invention is not limited thereto. The electronic apparatus 1 includes a processor 110, a communication circuit 120, and a storage 130.

The processor 110 is, for example, a central processing unit (CPU), a physics processing unit (PPU), a programmable microprocessor, an embedded control chip, a digital signal processor (DSP), an application-specific integrated circuit (ASIC), or other similar apparatuses.

The communication circuit 120 is, for example, a network card, a WiFi chip, a mobile communication chip, or the like.

The storage 130 is, for example, any type of fixed or removable random-access memory (RAM), read-only memory (ROM), flash memory, hard disk drive, other similar apparatuses, or a combination of the apparatuses. The storage 130 stores a plurality of code fragments, and the code fragments are executed by the processor 110 after being installed, so as to execute the method for calculating the object pick-and-place sequence. The storage 130 also includes a shelf database 131. The shelf database 131 stores the digitized data of each of a plurality of shelves (for example, shelf coordinate data and stocking records, etc.)

Figure 2A:
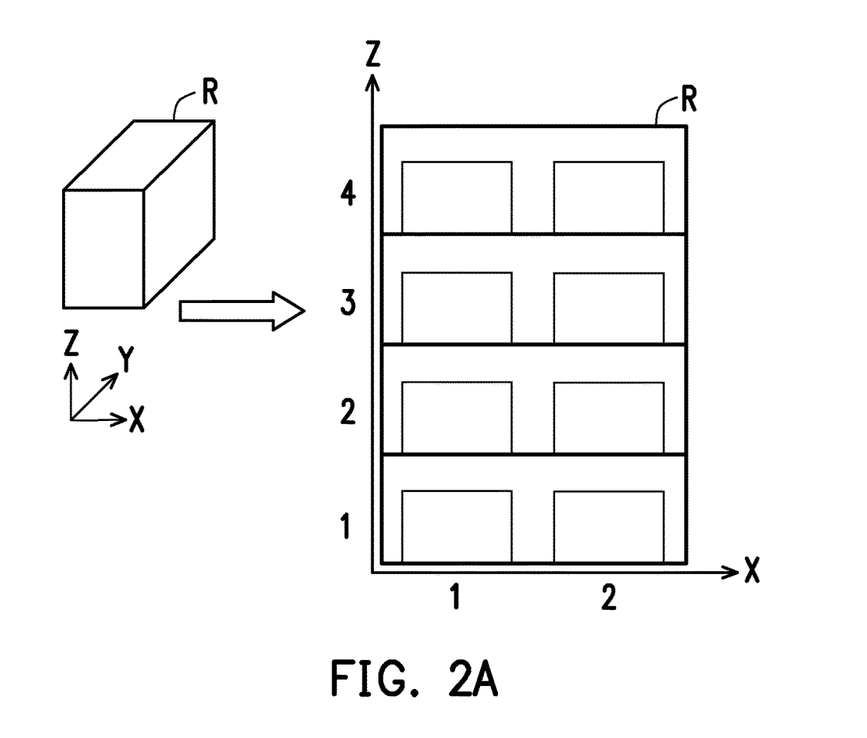
FIG. 2A and FIG. 2B are schematic diagrams of grid position coordination according to an embodiment of the invention.
Figure 2B:
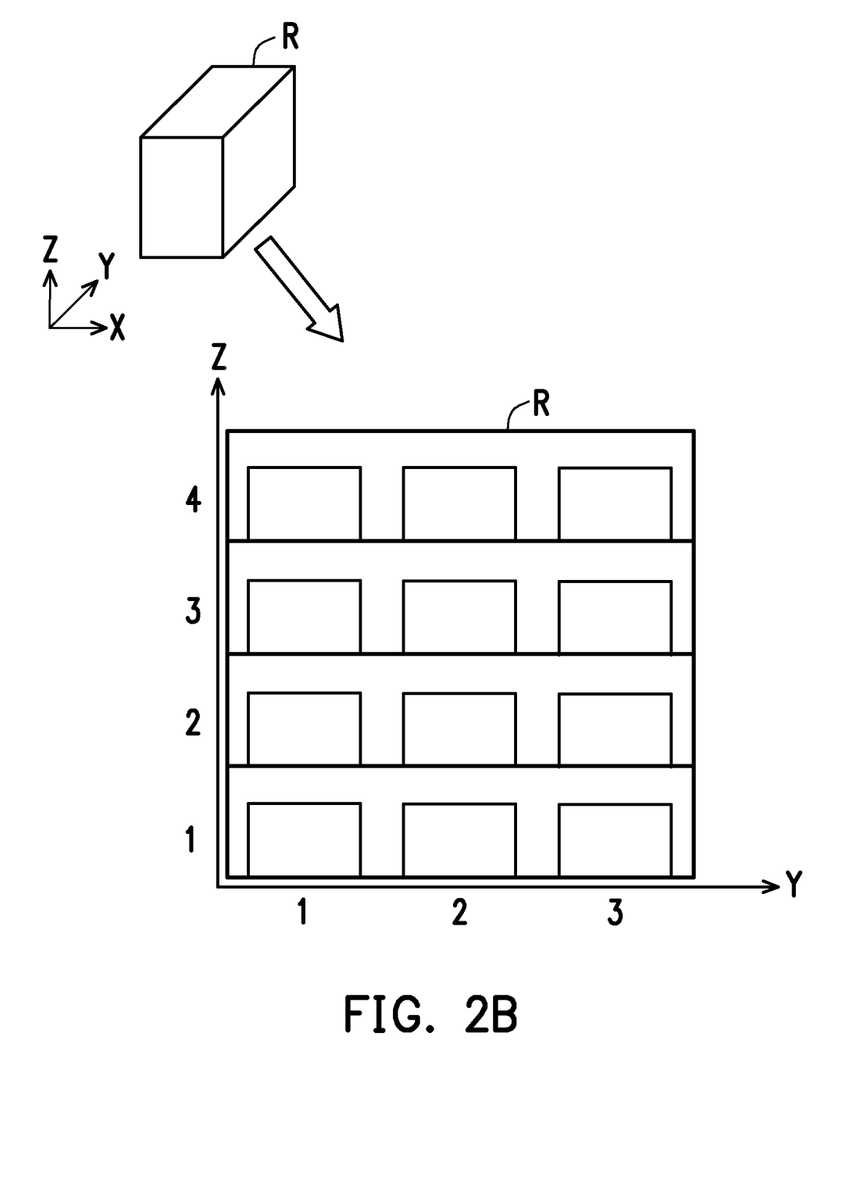

The processor 110 coordinates the grid positions included in the shelf. For example, FIG. 2A and FIG. 2B are schematic diagrams of grid position coordination according to an embodiment of the invention. FIG. 2A is a schematic diagram of the coordinates of a shelf R in the XZ plane, and FIG. 2B is a schematic diagram of the coordinates of the shelf R in the YZ plane. In the present embodiment, the shelf R is divided into two columns in the direction X, three rows in the direction Y, and four columns in the direction Z. The shelf R includes a total of 24 (=2×3×4) grid positions.

Moreover, the processor 110 further sets the balance standard area in the shelf, so as to determine the recommended position of the object to be stocked in the subsequent optimization calculation based on whether the center of gravity falls within the balance standard area.

Specifically, the processor 110 divides the shelf into a plurality of spaces in a vertical direction, and defines a plurality of balance standard areas in the spaces, respectively. For example, the vertical extending direction based on the center of gravity when no object is yet placed on the shelf is regarded as the central axis of the balance standard areas, and the plurality of balance standard areas are distinguished by a plurality of distances from the central axis in the horizontal plane.

Figure 3A:
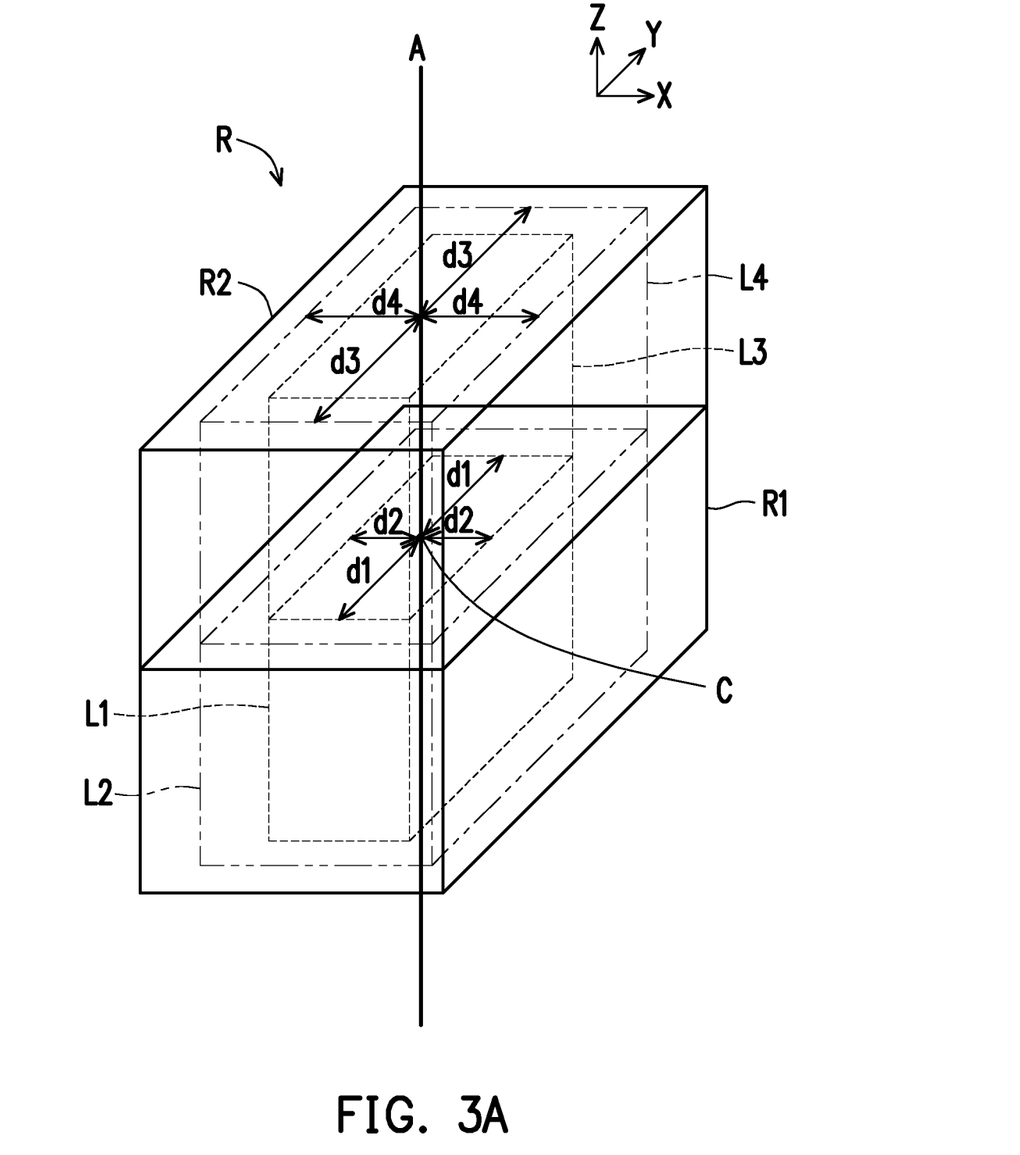
FIG. 3A is a schematic diagram of a shelf according to an embodiment of the invention.
Figure 3B:
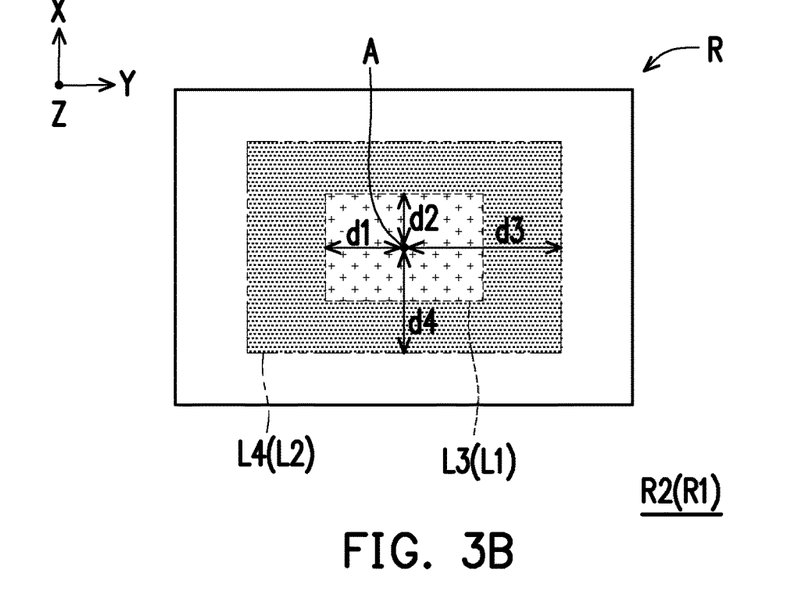
FIG. 3B is a schematic diagram of a balance standard area in a state of viewing a shelf in a direction Z according to an embodiment of the invention.
Figure 3C:
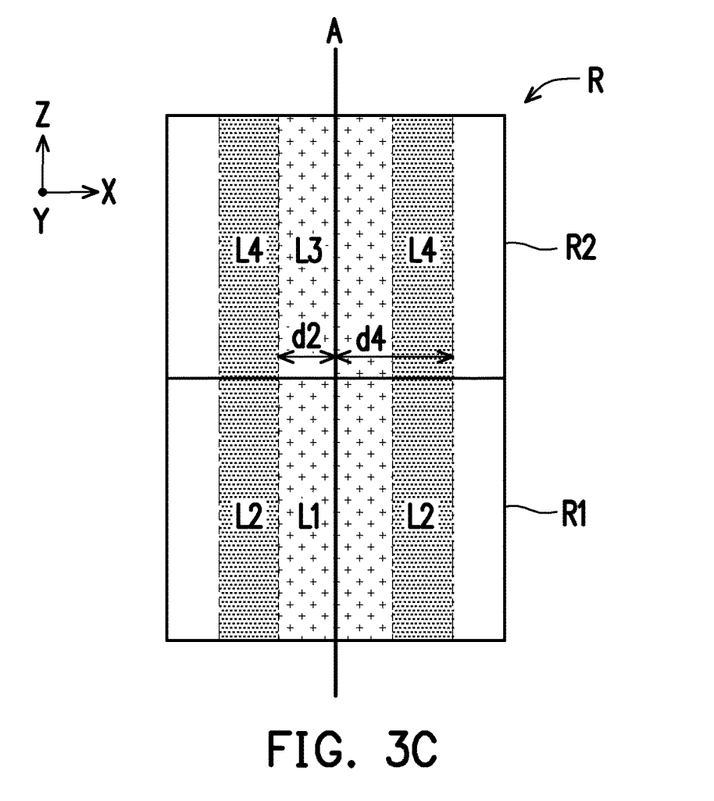
FIG. 3C is a schematic diagram of a balance standard area in a state of viewing a shelf in a direction Y according to an embodiment of the invention.

An example is given below to illustrate the setting of the balance standard areas. FIG. 3A is a schematic diagram of a shelf according to an embodiment of the invention. FIG. 3B is a schematic diagram of a balance standard area in a state of viewing a shelf in a direction Z according to an embodiment of the invention. FIG. 3C is a schematic diagram of a balance standard area in a state of viewing a shelf in a direction Y according to an embodiment of the invention. In the embodiments shown in FIG. 3A to FIG. 3C, the shelf R is divided into two spaces R1 and R2 in the vertical direction (i.e., the direction Z), balance standard areas L1 and L2 are defined in the space R1, and balance standard areas L3 and L4 are defined in the space R2.

More specifically, the processor 110 regards the vertical extending direction (i.e., the direction Z) based on a center of gravity C when no object is yet placed on the shelf R in the balance standard areas L1 to L4 as a central axis A, and distinguishes the balance standard areas L1 to L4 by a plurality of distances from the central axis A on the horizontal plane (the direction X and the direction Y). For example, the balance standard areas L1 and L3 are divided by a distance d1 between the central axis A on two sides of the direction Y and a distance d2 between the central axis A on two sides of the direction X. That is, the length and width of the balance standard areas L1 and L3 on the XY plane are 2d1 and 2d2. Moreover, the balance standard areas L2 and L4 are divided by a distance d3 between the central axis A on two sides of the direction Y and a distance d4 between the central axis A on two sides of the direction X. That is, the length and width of the balance standard areas L2 and L4 on the XY plane are 2d3 and 2d4. Here, the distance d1 is less than the distance d3, and the distance d2 is less than the distance d4.

Here, to the number of spaces divided in the vertical direction is not limited, and the number of balance standard areas in each space is also not limited, which may be determined according to the size of the shelf and the usage.

The balance standard areas L1 to L4 each have a corresponding balance level. Based on the general principle of cargo storage balance, when cargo is stored, the cargo is preferentially placed below and inside, that is, the cargo is more stable at the bottom than at the top, and more stable on the inside than the outside. Therefore, the balance levels 1 to 4 (from stable to unstable) are the balance standard area L1, the balance standard area L2, the balance standard area L3, and the balance standard area L4 in sequence.

Specifically, when the center of gravity position is located in the balance standard area L1, and the balance level of the shelf R is 1, in the direction Z, the center of gravity position is located in the space R1; in the direction Y, the distance dy between the center of gravity position and the central axis A is less than the distance d1; in the direction X, the distance dx between the center of gravity position and the central axis A is less than the distance d2. Moreover, when the center of gravity is located in the balance standard area L3 and the balance level of the shelf R is 3, the center of gravity is located in the space R2. In the XY plane, the distance dy is less than the distance d1 and the distance dx is less than the distance d2.

When the center of gravity position is located in the balance standard area L2, and the balance level of the shelf R is 2, in the direction Z, the center of gravity position is located in the space R1; in the XY plane, the distance dy from the central axis A is less than the distance d3, and the distance dx is less than the distance d4, and at least one of the following conditions is satisfied: the distance dy is greater than d1; and the distance dx is greater than d2. Moreover, when the center of gravity is located in the balance standard area L4 and the balance level of the shelf R is 4, the center of gravity is located in the space R2. The satisfaction conditions of the distance dy and the distance dx in the XY plane are the same as those located in the balance standard area L2.

If the distance dy of the center of gravity in the XY plane is greater than d3 or the distance dx is greater than the distance d4, the center of gravity is outside the balance standard areas L1 to L4, and the shelf R may not be balanced.

Figure 4:
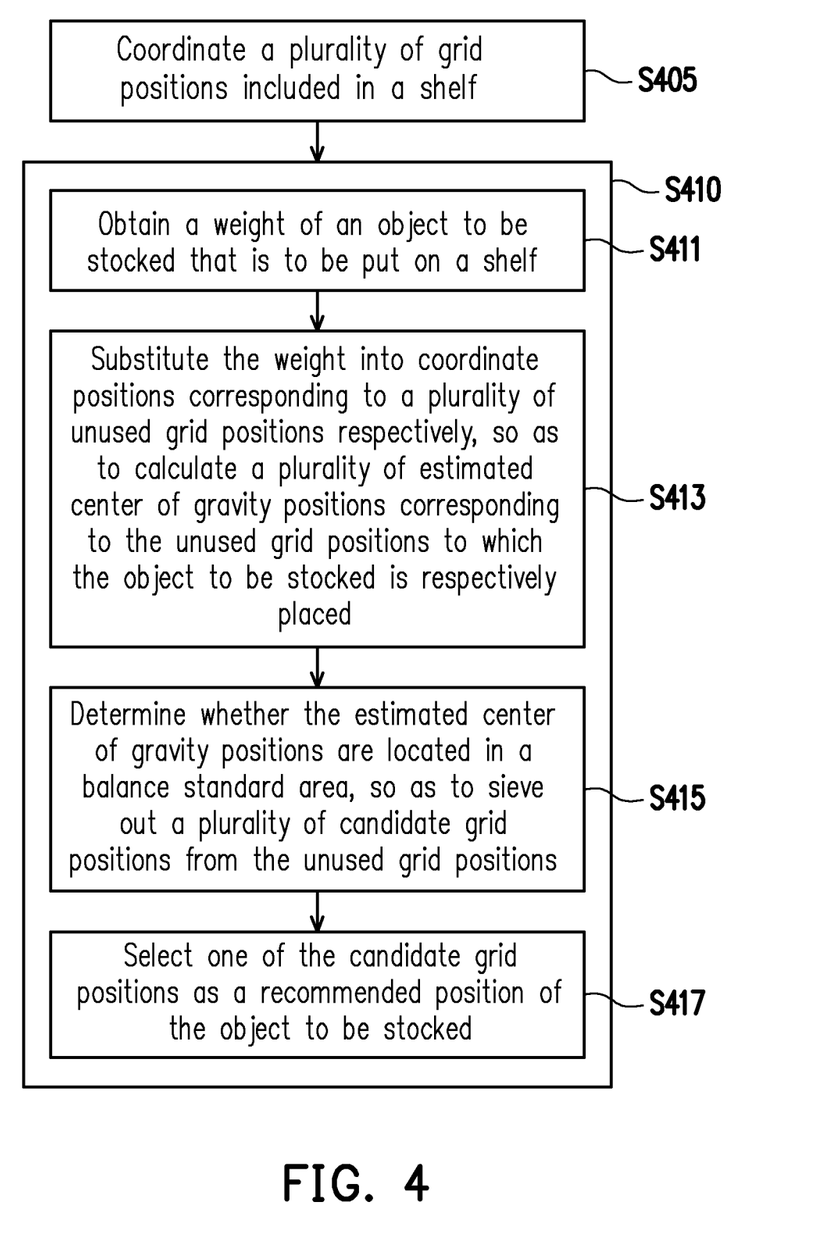
FIG. 4 is a flowchart of a method for calculating an object pick-and-place sequence according to an embodiment of the invention.

FIG. 4 is a flowchart of a method for calculating an object pick-and-place sequence according to an embodiment of the invention. Please refer to FIG. 1 to FIG. 4 simultaneously.

First, in step S405, in the electronic apparatus 1, the processor 110 coordinates a plurality of grid positions included in the shelf R.

Next, in step S410, when a warehousing operation is to be performed, an optimization calculation is performed via the processor 110. In the case where there is already a stocked object on the shelf R, the processor 110 performs an optimization calculation, that is, the processor 110 first obtains the weight of the stocked object to be put on the shelf R, so as to obtain the recommended position based on the weight. The optimization calculation includes steps S411 to S417.

Moreover, when the warehousing operation is to be performed, if no object is yet placed on the shelf R, the processor 110 selects one of a plurality of grid positions as the recommended position of the object to be stocked based on a preset sequence. That is, while coordinating the plurality of grid positions of the shelf R, the processor 110 may further set the preset sequence based on the general principle of cargo storage balance, so that when the shelf R is initially stored, objects are placed based on the preset sequence.

In step S411, the processor 110 obtains the weight of the object to be stocked that is to be put on the shelf R. In the electronic apparatus 1, the processor 110 obtains the object information of each of the plurality of objects to be processed from the scanner 3 via the communication circuit 120, thereby obtaining the weight of each object to be processed and the corresponding object code thereof. Next, the processor 110 performs an optimization calculation on the objects to be processed as the object to be stocked one by one, thereby obtaining the recommended position corresponding to each object to be processed.

In the present embodiment, before a warehousing operation is to be performed on one selected shelf (e.g., the shelf R) of the plurality of shelves, the identification codes attached to the plurality of objects to be processed may be scanned first via the scanner 3, thereby obtaining object information. The scanner 3 then transmits the object information to the electronic apparatus 1 via a wired or wireless transmission technique.

After the object information of each of the objects to be processed is obtained, the processor 110 may also, based on the weight of each object to be processed, determine the object stocking sequence of the objects to be processed on the shelves, and based on the object stocking sequence, regard the objects to be processed as the objects to be stocked one by one. For example, the objects to be processed are sorted based on weight, starting from the one with the highest weight, and the objects to be processed are regarded as the object to be stocked one by one, but not limited thereto.

Then, in step S413, the processor 110 respectively substitutes the weights of the objects to be stocked into a plurality of coordinate positions corresponding to a plurality of unused grid positions, thereby calculating a plurality of estimated center of gravity positions corresponding to the unused grid positions in which the objects to be stocked is respectively placed. The calculation equation for the estimated center of gravity position (static) is as follows:

$$\overline{X_i} = \frac{X_1 W_1 + \ldots + X_n W_n + X_i W_t}{W_1 + \ldots + W_n + W_t};$$

$$\overline{Y_i} = \frac{Y_1 W_1 + \ldots + Y_n W_n + Y_i W_t}{W_1 + \ldots + W_n + W_t};$$

-continued $$\overline{Z_i} = \frac{Z_1 W_1 + \ldots + Z_n W_n + Z_i W_t}{W_1 + \ldots + W_n + W_t}.$$

In particular, $(X_1, Y_1, Z_1)$ to $(X_n, Y_n, Z_n)$ are the coordinate positions of the used grid positions where the stocked objects are placed on the shelf R, $W_1$ to $W_n$ are the weights of the stocked objects already placed on the shelf R, $(X_i, Y_i, Z_i)$ is the coordinate position of the i-th unused grid position, $W_t$ is the weight of the object to be stocked, and $(\overline{X_i}, \overline{Y_i}, \overline{Z_i})$ is the estimated center of gravity of the shelf R when the object to be stocked is placed in the i-th unused grid position. Using the above equation, the estimated center of gravity position of the shelf R may be calculated when the object to be stocked is placed in each unused grid position.

Then, in step S415, the processor 110 determines whether the estimated center of gravity position is located within the balance standard areas L1 to L4, so as to sieve out a plurality of candidate grid positions from the unused grid positions. After the processor 110 calculates a plurality of estimated center of gravity positions of the object to be stocked corresponding to a plurality of unused grid positions, the processor 110 removes the unused grid positions with an estimated center of gravity position outside the balance standard areas L1 to L4, and regards the unused grid positions corresponding to the estimated center of gravity positions falling within the balance standard areas L1 to L4 as candidate grid positions.

Moreover, if none of the estimated center of gravity positions are within the balance standard area, the storage position of at least one stocked object already present on the shelf R may be readjusted via the processor 110. In this way, the stability of the shelf R is not affected after the current objects to be stocked are put on the shelf R. For example, assuming that the current balance level of the shelf R is 4, that is, the current center of gravity position of the shelf R falls within the balance standard area L4, the storage position of the at least one stocked object already present on the shelf R is readjusted via the processor 110, so that the balance level of the shelf R is adjusted to 1, 2, or 3. That is, the center of gravity position of the shelf R is adjusted to fall within one of the balance standard areas L1 to L3.

Here, in the above descriptions, the actual pick-and-place action is performed by the pick-and-place machine 2 only after the simulation calculation is performed by the processor 110.

Then, in step S417, the processor 110 selects one of the candidate grid positions as the recommended position of the object to be stocked. In the present embodiment, the processor 110 selects the recommended position according to the following sequence. First, a candidate grid position that may improve the balance level of the shelf R is preferentially selected. If there is no candidate grid position that may improve the balance level of the shelf R, a candidate grid position that may maintain the current balance level of the shelf R is selected. If there is no candidate grid position that may maintain the current balance level, a candidate grid position reducing the balance level of the shelf R but still having an estimated center of gravity position within the balance standard areas L1 to L4 is selected.

Specifically, in the case that there is already a stocked object on the shelf R, the processor 110 calculates the current center of gravity position of the shelf, and determines the current balance level of the shelf based on the current center of gravity position. For example, assuming that the current center of gravity position falls within the balance standard area L2, the current balance level is determined to be 2.

Next, the processor 10 determines the estimated balance level of the shelf R in a case that that the object to be stocked is placed in each of the candidate grid positions based on the plurality of center of gravity positions calculated from respectively placing the object to be stocked to the plurality of candidate grid positions. For example, assuming that there are 3 candidate grid positions a1 to a3, and the center of gravity positions thereof fall within the balance standard areas L1, L2, and L3, respectively, the estimated balance levels corresponding to the candidate grid positions a1 to a3 are determined to be 1, 2, and 3, respectively.

Then, the processor 110 compares the current balance level with an estimated balance level, and selects one of the candidate grid positions corresponding to an estimated balance level of 1 as the recommended position of the object to be stocked. That is, a candidate grid position with an estimated balance level better than the current balance level is preferentially selected as the recommended position.

In actual operation, the object to be stocked is, for example, an ingot. Before a plurality of ingots are to be placed on the shelf R, the object information of the plurality of ingots to be placed on the shelf R is scanned via the scanner 3. Next, the processor 110 retrieves the object information of one of the ingots to execute steps S411 to S417 above. If there is no recommended position, the processor 110 performs an adjustment calculation, and then the pick-and-place machine 2 is used to actually adjust the positions of the ingots already stocked on the shelf R. If the recommended position is calculated, the ingots are placed on the shelf R via the pick-and-place machine 2, and the current balance level is recorded. Next, the processor 110 retrieves the object information of the next ingot and executes steps S411 to S417 above until all the ingots are placed on the shelf R.

In addition, the processor 110 may also calculate the recommended position corresponding to each ingot, and then put each ingot in the corresponding recommended position in sequence via the pick-and-place machine 2.

Based on the above, in the embodiments, a specific object pick-and-place strategy is proposed, that is, an optimization calculation is performed during the warehousing operation to find the best placement position that does not affect the balance of the shelf. In this way, the safety level and stability of automatic warehousing execution are improved, and the proportion of industrial accidents when robots are transporting shelves is reduced.

What is claimed is:

1. A method for calculating an object pick-and-place sequence, comprising:
   coordinating a plurality of grid positions comprised on a shelf; and
   performing an optimization calculation when a warehousing operation is to be performed, wherein the optimization calculation comprises:
   obtaining a weight of an object to be stocked that is to be put on the shelf;
   substituting the weight into a plurality of coordinate positions corresponding to a plurality of unused grid positions in the grid positions, respectively, so as to calculate a plurality of estimated center of gravity positions corresponding to the unused grid positions in which the object to be stocked is respectively placed;
   determining whether the estimated center of gravity positions are located within a balance standard area so as to sieve out multiple from these unused grid positions as a plurality of candidate grid positions, wherein an estimated center of gravity position corresponding to each of the candidate grid positions falls within the balance standard area; and selecting one of the candidate grid positions as a recommended position of the object to be stocked, wherein a central axis of the balance standard area is a vertical extending direction based on a center of gravity when no object is yet placed on the shelf, and a length and a width of the balance standard area on a horizontal plane are determined based on a first distance from the central axis on both sides of a first direction on the horizontal plane and a second distance from the central axis on both sides of a second direction on the horizontal plane.

2. The method for calculating the object pick-and-place sequence of claim 1, further comprising:

obtaining object information of each of a plurality of objects to be processed to obtain the weight of each of the objects to be processed; and regarding the objects to be processed as the object to be stocked one by one, so as to obtain the recommended position corresponding to each of the objects to be processed.

3. The method for calculating the object pick-and-place sequence of claim 2, further comprising, after the step of obtaining the object information of each of the objects to be processed:

determining an object stocking sequence in which the objects to be processed are placed on the shelf based on the weight of each of the objects to be processed; and regarding the objects to be processed as the object to be stocked one by one based on the object stocking sequence.

4. The method for calculating the object pick-and-place sequence of claim 1, wherein the optimization calculation further comprises:

selecting one of the grid positions as the recommended position of the object to be stocked based on a preset sequence in a case that no object is yet placed on the shelf; and obtaining the weight of the object to be stocked that is to be put on the shelf in a case that there is a stocked object on the shelf, so as to obtain the recommended position based on the weight.

5. The method for calculating the object pick-and-place sequence of claim 1, further comprising, after whether the estimated center of gravity positions are located in the balance standard area is determined:

adjusting a storage position of at least one stocked object already present on the shelf in a case that none of the estimated center of gravity positions are within the balance standard area.

6. The method for calculating the object pick-and-place sequence of claim 1, further comprising:

calculating a current center of gravity position of the shelf in a case that there is a stocked object in the shelf, and determining a current balance level of the shelf based on the current center of gravity position;

determining an estimated balance level of the shelf in a case that the object to be stocked is placed in each of the candidate grid positions based on the estimated center of gravity positions calculated from respectively placing the object to be stocked to the candidate grid positions; and selecting one of the candidate grid positions as the recommended position of the object to be stocked by comparing the current balance level with the estimated balance level.

7. The method for calculating the object pick-and-place sequence of claim 6, further comprising:

dividing the shelf into a plurality of spaces in a vertical direction, and defining a plurality of the balance standard area in the spaces respectively, wherein a vertical extending direction based on the center of gravity when no object is yet placed on the shelf is regarded as the central axis of a plurality of the balance standard area, a plurality of the balance standard area are distinguished with a plurality of distances from the central axis in the horizontal plane, and each of the balance standard areas has a corresponding relationship with the estimated balance level corresponding to the shelf.

8. An electronic apparatus for automatic storage pick-and-place, comprising:

a storage comprising a shelf database, wherein the shelf database stores shelf coordinate data and a storage record respectively corresponding to a plurality of shelves;

a processor coupled to the storage, and the processor is configured to:

coordinate a plurality of grid positions comprised on each of the shelves to obtain the corresponding shelf coordinate data, and store the shelf coordinate data in the shelf database; and perform an optimization calculation when a warehousing operation is to be performed on one selected shelf among the shelves, wherein the optimization calculation comprises:

obtaining a weight of an object to be stocked that is to be put on the selected shelf;

substituting the weight into a plurality of coordinate positions corresponding to a plurality of unused grid positions in the grid positions comprised in the selected shelf, respectively, so as to calculate a plurality of estimated center of gravity positions corresponding to the unused grid positions in which the object to be stocked is respectively placed;

determining whether the estimated center of gravity positions are located within a balance standard area so as to sieve out multiple from these unused grid positions as a plurality of candidate grid positions, wherein an estimated center of gravity position corresponding to each of the candidate grid positions falls within the balance standard area; and selecting one of the candidate grid positions as a recommended position of the object to be stocked, wherein a central axis of the balance standard area is a vertical extending direction based on a center of gravity when no object is yet placed on the shelf, and a length and a width of the balance standard area on a horizontal plane are determined based on a first distance from the central axis on both sides of a first direction on the horizontal plane and a second distance from the central axis on both sides of a second direction on the horizontal plane.

9. The electronic apparatus for automatic storage pick-and-place of claim 8, further comprising:

a communication circuit coupled to the processor, wherein the processor is configured to: transmit the recommended position to a pick-and-place machine via the communication circuit.

10. The electronic apparatus for automatic storage pick-and-place of claim 9, wherein the processor is configured to obtain the weight of the object to be stocked that is to be placed on the selected shelf from a scanner via the communication circuit.

11. The electronic apparatus for automatic storage pick-and-place of claim 8, wherein the processor is configured to:
    obtain object information of each of a plurality of objects to be processed to obtain the weight of each of the objects to be processed; and
    regard the objects to be processed as the object to be stocked one by one, so as to obtain the recommended position corresponding to each of the objects to be processed.

12. The electronic apparatus for automatic storage pick-and-place of claim 11, wherein the processor is configured to:
    determine an object stocking sequence in which the objects to be processed are placed on the selected shelf based on the weight of each of the objects to be processed; and
    regard the objects to be processed as the object to be stocked one by one based on the object stocking sequence.

13. The electronic apparatus for automatic storage pick-and-place of claim 8, wherein the processor is configured to:
    select one of the grid positions as the recommended position of the object to be stocked based on a preset sequence in a case that no object is yet placed on the selected shelf; and
    obtain the weight of the object to be stocked that is to be put on the selected shelf in a case that there is a stocked object on the selected shelf, so as to obtain the recommended position based on the weight.

14. The electronic apparatus for automatic storage pick-and-place of claim 8, wherein the processor is configured to:
    adjust a storage position of at least one stocked object already present on the selected shelf in a case that none of the estimated center of gravity positions are within the balance standard area.

15. The electronic apparatus for automatic storage pick-and-place of claim 8, wherein the processor is configured to:
    divide the selected shelf into a plurality of spaces in a vertical direction, and define a plurality of the balance standard area in the spaces respectively, wherein a vertical extending direction based on the center of gravity when no object is yet placed on the selected shelf is regarded as the central axis of a plurality of the balance standard area, a plurality of the balance standard area are distinguished with a plurality of distances from the central axis in the horizontal plane,
    calculate a current center of gravity position of the selected shelf in a case that there is a stocked object on the selected shelf, and determine a current balance level of the selected shelf based on the current center of gravity position;
    determine an estimated balance level of the selected shelf in a case that the object to be stocked is placed in each of the candidate grid positions based on the estimated center of gravity positions calculated from respectively placing the object to be stocked to the candidate grid positions, wherein each of the balance standard areas has a corresponding relationship with the estimated balance level corresponding to the selected shelf; and
    select one of the candidate grid positions as the recommended position of the object to be stocked by comparing the current balance level with the estimated balance level.

\* \* \* \* \*